May 19, 1959   E. H. JONES   2,887,087
APPARATUS FOR THE AUTOMATIC REGULATION OF THE CONTINUOUS
APPLICATION OF SPECIFIED AMOUNTS OF SOLIDS OR
LIQUIDS TO A MOVING SHEET OF MATERIAL
Filed Aug. 1, 1957
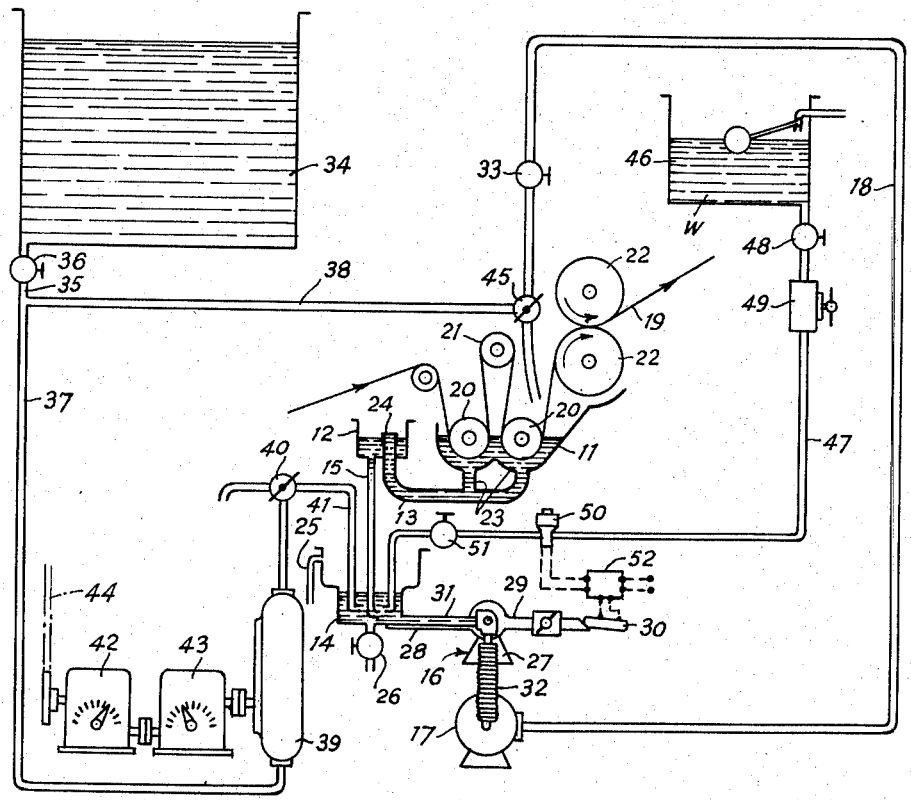
INVENTOR.
ERIC HARDING JONES
BY Frederick Breitenfeld
ATTORNEY

United States Patent Office 2,887,087
Patented May 19, 1959

2,887,087

APPARATUS FOR THE AUTOMATIC REGULATION OF THE CONTINUOUS APPLICATION OF SPECIFIED AMOUNTS OF SOLIDS OR LIQUIDS TO A MOVING SHEET OF MATERIAL

Eric Harding Jones, Bramhall, England, assignor to The British Cotton Industry Research Association, Manchester, England, a British association Application August 1, 1957, Serial No. 675,580

6 Claims. (Cl. 118—7)

This invention concerns the automatic regulation of the continuous application of specified amounts of solids or liquids to a moving sheet of material.

In my prior Patent Number 2,583,267 I have described a method of applying to a continuously moving sheet of material a prescribed weight per unit length of a substance, wherein such substance is supplied to a reservoir and from which reservoir it is applied as a neat fluid or in solution or dispersion in a fluid medium to the said moving sheet of material characterised in that the substance is supplied to the said reservoir at a rate predetermined by the speed of movement of the sheet of material and the said prescribed weight of substance per unit length to be applied thereto, and in that any change in weight of fluid in the reservoir which results from a deviation of actual rate of application of the substance from the prescribed rate of application, is utilized to alter some property of the fluid in the reservoir so as to correct the said deviation and also apparatus for putting such a method into effect.

Whilst the particular methods and apparatus described in the specification of our prior patent aforesaid are suitable, for example, for warp-sizing operations, there are other operations in which a prescribed weight per unit length of a substance must be applied to a moving sheet of material, for which those methods and apparatus are not suitable. Operations in which the substance requires substantial agitation and in which steam cannot be used for this purpose, and operations in which the substance used is expensive and a small operative volume is desirable may be cited as examples, and the object of the present invention is to provide a method and means suitable for such operations particularly.

According to the present invention a method of applying to a continuously moving sheet of material a prescribed weight per unit length of a substance, wherein such substance is supplied to a reservoir and from which reservoir it is applied, dissolved, dispersed, emulsified or the like in a liquid medium (hereafter all referred to as "liquid") to the said moving sheet of material, the substance being supplied to the said reservoir at a rate predetermined by the speed of movement of the sheet of material and the said prescribed weight of substance to be applied thereto, is characterised in that the said reservoir forms part of a closed circulatory system of small capacity, in that any deviation of actual rate of application of the substance from the prescribed rate of application is adapted correspondingly to affect the rate of flow from said reservoir to another part of the system, and in that change in the weight of liquid in the other part of the circulatory system consequent on any such change in the rate of flow from the reservoir is utilized to alter the concentration of the liquid so as to correct the actual rate of application of the substance.

Preferably the liquid is supplied to the said other part of the circulatory system as separate supplies of a concentrated stock liquor of the substance, and of a diluent, and any change in weight of the liquid in the other part of the circulatory system is used to change the rate of supply of the diluent so as to correct the actual rate of application of the substance by changing the concentration of the substance in the liquid.

Also according to the present invention apparatus for applying to a continuously moving sheet of material a prescribed weight per unit length of a substance, and comprising a reservoir adapted to hold a solution, dispersion, emulsion or the like of the substance in a liquid medium (hereafter all referred to as "liquid"), means for supplying the substance to the reservoir at a rate predetermined by the said prescribed weight and by the rate of movement of the material, means for applying the liquid from the reservoir to the material, and means for varying the amount of liquid taken up, is characterised by a closed circulatory system, of which said reservoir forms part, of small capacity, overflow means associated with the reservoir and sensitive to the level of liquid in the reservoir so that any deviation of the actual rate of application of the substance from the prescribed rate of application will correspondingly affect the rate of flow from the reservoir, a vessel in said system disposed to receive the overflow from the reservoir, and means, sensitive to change in the weight of liquid in said vessel consequent on such change in rate of flow from the reservoir, and then adapted to cause the concentration of said liquid to be altered so as to correct the actual rate of application of the substance.

Preferably the apparatus further comprises means for supplying a concentrated stock liquor of the substance to said vessel at the said predetermined rate, and means for supplying a diluent to said vessel operably connected to the means responsive to the weight of liquid in said vessel. The means for supplying a concentrated stock liquor to the vessel may comprise a pump and variable speed gearing driven at a rate proportional to the speed of movement of the material.

A balance is a convenient means responsive to the change in weight of liquid in said vessel, one arm thereof supporting the vessel, and the other arm thereof carrying an adjustable weight and being adapted on movement to operate a switch. When using such a balance a valve would be provided to control the means for supplying the diluent to the vessel, the switch being in an electric circuit arranged to operate the valve.

To allow liquid to pass out from the vessel one suitable arrangement is to lay a pipe along the arm of the balance to the pivot point of the balance, and then to provide between the pivot point and a circulating pump a flexible pipe.

Although it is preferred to ascertain change in weight of liquid in the appropriate part of the circulatory system by direct measurement thereof, it may be ascertained by indirect measurement from change of volume, depth or pressure.

When the circulatory system is referred to as of "small capacity" it is meant that its capacity is so related to the rate of incoming liquid that firstly, the circulatory flow is rapid, causing substantial agitation, and, consequently, homogeneity of the liquid applied to the fabric and that, secondly, the change in the rate of addition of diluent consequent upon a given change in weight of liquid in the other port of the circulatory system or vessel resulting from a deviation in rate of take-up of substance from the prescribed rate, brings about as rapid a change as possible in the concentration of the liquid so as to correct such deviation as rapidly as possible. Furthermore the smaller the capacity of the system the less the waste.

The invention will now be described further, by way of example, with reference to the accompanying drawings, in which the single figure illustrates, diagrammatically, one apparatus in accordance with the invention, designed for the application of a crease-resistant and flameproof finish to a length of textile fabric.

Basically, the apparatus used comprises a reservoir in the form of a pad box for a liquid preparation which is a resin for giving crease resistance and having also flame proofing qualities; a closed circulatory system of small capacity of which the pad box forms part; means for supplying the circulatory system with a concentrated liquor in accordance with the amount per unit area of fabric required; means for feeding a diluent to the circulatory system; means for controlling the amount of diluent fed to the system in such a manner that deviation from the required rate of take up by the fabric is corrected; and means for progressing the fabric through the pad box.

The circulatory system consists of the pad box 11, an overflow box 12, connected by a pipe 13 to the pad box 11, a control box 14 into which a pipe 15 depends from the overflow box 12, a balance 16, and a circulating pump 17 for conveying the liquid from the balance to the pad box through a suitable pipe system 18.

The pad box 11 is of a length adequate to accommodate the width of the fabric 19 and in end elevation (as shown) is of W-shape. In each side a roller 20 is disposed for rotation, and these rollers, in combination with other suitable rollers 21, 22 disposed thereabove, constitute the means for progressing the fabric 19 through the pad box 11 whereby it is enabled to take up the liquid.

From the bottom of each half of the pad box 11 at one end a pipe 23 of substantial cross-section extends, first downwardly, and then, after merging to form the common pipe 13 upwardly through the base of the overflow box 12. This common pipe 13 terminates at a level corresponding to the desired liquid level in the pad box 11 and is fitted with a filter 24.

From the bottom of the overflow box 12 the pipe 15 is downwardly directed into the lower portion of the control box 14. The latter has its lower portion of substantially smaller capacity than the pad box, but its upper portion is of much greater cross-section and, hence, capacity. The upper portion is provided with an emergency overflow 25 and at the base of the control box 14 a drain cock 26 is fitted.

Adjacent the control box is disposed the balance 16. This consists of a suitable base 27 which supports the balance member proper. The control box 14 itself is supported on one arm 28 of the balance member whilst on the other arm 29 is an adjustable weight arm adapted to operate a mercury switch 30. A pipe 31 leads from the bottom of the interior control box 14 to the pivot point of the balance 16, from whence a flexible pipe 32 connects to the circulating pump 17. The pipe system 18 leads from the circulating pump 17 to a throttle control 33 and finally to the pad box 11.

The means for supplying the concentrated liquor consists of a supply tank 34 and various pipes, valves and other controls now described. A pipe 35 provided with an on-off cock 36 leads from the bottom of the tank 34, and branches into two pipes 37, 38. The pipe 37 leads to a metering pump 39, and then to a control valve 40, a branch pipe 41 then passing downwardly into the lower portion of the control box 14. The metering pump 39 is driven through two variable speed gears 42, 43 by a drive 44 taken from the main drive (that is, the drive for the fabric rollers 22). The gears 42, 43 are calibrated for adjustment according to the width of fabric 19 and amount of substance required per unit area thereof respectively so that the supply of liquor to the control box 14 can be pre-set. The other pipe 38 leads through a by-pass valve 45 to the pad box 11 to enable the initial priming of the circulatory system to be effected.

The means for feeding a diluent to the circulatory system consists of a float-controlled elevated water cistern 46, and a pipe 47 leading downwardly therefrom to the lower portion of the control box 14. In this pipe 47 are, successively from the cistern 46, an on-off cock 48, a self-cleaning filter 49, a magnetic valve 50 and a needle valve 51.

The means for controlling the amount of diluent fed to the circulatory system consists of the balance 16, the magnetic valve 50 and an electrical control circuit 52, by means of which the balance-operated mercury switch 30 is arranged to open or close an A.C. mains supply through a rectifier to the magnetic valve, the magnetic valve being opened or closed accordingly.

In operation the circulatory system is first primed and then the machine started up. If the fabric 19 on its passage through the pad box 11 takes up too much resin the overflow through pipe 13 will become reduced and there will be a decrease in the weight of liquid in the control box 14. In consequence of this decrease the balance 16 will move and the mercury switch 30 be operated to close the electrical circuit 52. The magnetic valve 50 will then open and water W from cistern 46 will begin to flow into the control box 14. The flow will continue until the weight of liquid in the control box has been restored. The balance 16 will then move to open the switch 30, and therefore close the magnetic valve 50. This system is an on-off system and can be designed to effect a very sensitive control over the weight of take-up over a given length of fabric. A continuous control could be achieved by substituting an adjustable metering pump for the magnetic valve and a controller for the mercury switch. By these means a varying amount of water or other diluent would be obtained as the balance moved and caused the controller to adjust the pump speed.

Points of importance in the embodiment just described are:

(1) The provision of large overflow pipes from the bottom of the pad box 11 prevents foam or froth from circulating.

(2) The capacity of the whole circulatory system is small (in the embodiment just described about three gallons) and therefore the system can be arranged to be very sensitive to changes in rate of take-up, and the control means to respond rapidly thereto. Furthermore, there is substantial agitation due to the inflow of liquor and diluent. Another important advantage of the small capacity of the circulatory system is that waste is minimised.

(3) The control box is designed to be sensitive and efficient in operation. The adjustable weight enables delicate operative adjustments to be made. The provision of the large capacity upper portion enables the box to take up excess liquid which runs off the cloth into the pad box when the machine is stopped.

There are three pipes which depend into the lower portion of the box and their ends are so shaped (as for example as shown in the drawings) and directed that the reaction on the control box due to the liquids issuing therefrom is minimised.

(4) The provision of the flexible pipe and its mounting at the pivot reduces the restoring force on the balance to a minimum.

What I claim is:

1. Apparatus for supplying to a continuously moving sheet of linear material a prescribed weight per unit length of a substance, comprising in combination, a circulatory reservoir system, means for metering the substance in liquid form to said reservoir system at a rate so related to the speed of movement of said material that the prescribed weight per unit length passing is metered in spite of variation in said speed of movement, the capacity of said system is such as to ensure that the incoming liquid may be rapidly circulated around said reservoir system, means for progressing said material and causing liquid to be taken up thereby at one part of said reservoir system, overflow means associated with said one part of said reservoir system and sensitive to the level of liquid therein so that any deviation of the actual rate of application of the substance from the prescribed rate of application will correspondingly affect the rate of overflow from said one part of said reservoir system, a vessel in said system disposed to receive the overflow from said one part, means for circulating the liquid at a constant rate from said vessel to said one part of said reservoir system, and control means, adapted, on any change in the amount of liquid in said vessel consequent upon any such change in rate of flow to said vessel, to cause the concentration of the substance in the liquid to be altered so as to correct said deviation.

2. Apparatus as claimed in claim 1 further comprising means for supplying a concentrated stock liquor of said substance to said vessel, and means for supplying a diluent to said vessel, said control means being adapted to control the supply of diluent to alter said concentration.

3. Apparatus as claimed in claim 1 further comprising a balance, said vessel being supported on one arm of said balance, an adjustable weight on the other arm of said balance, a switch adapted to be closed or opened depending on whether said other arm is to one side or the other of a datum position, an electric circuit controlled by said switch, and a valve for diluent supply operated by said circuit.

4. Apparatus as claimed in claim 3 further comprising a pipe laid from the outlet of said vessel along said one arm of said balance to the pivot point of the latter, a pump for circulating liquid around said reservoir system, and a flexible pipe connecting the inlet side of said pump to said pipe at said pivot point.

5. Apparatus as claimed in claim 1 further comprising a pipe through which concentrated stock liquor of said substance may be supplied to said vessel, a pipe through which diluent may be supplied to said vessel, and a pipe for conducting said overflow to said vessel, all said pipes depending into said vessel and having their ends so shaped and directed as to minimise the reaction on said vessel due to the liquids issuing therefrom.

6. Apparatus as claimed in claim 1 further comprising a container constituting said one part of said reservoir system, and outlet means of substantial cross-section from the base of said container to said overflow means.

References Cited in the file of this patent

UNITED STATES PATENTS

| | | |
|---|---|---|
| 2,583,267 | Jones | Jan. 22, 1952 |
| 2,623,496 | Lowell | Dec. 30, 1952 |

FOREIGN PATENTS

| | | |
|---|---|---|
| 275,768 | Switzerland | Sept. 1, 1951 |